United States Patent
Shapiro

(10) Patent No.: US 9,043,613 B2
(45) Date of Patent: May 26, 2015

(54) MULTIPLE VOLUME ENCRYPTION OF STORAGE DEVICES USING SELF ENCRYPTING DRIVE (SED)

(71) Applicant: International Business Machines Corporation, Armonk, NY (US)

(72) Inventor: Rony S. Shapiro, Tel-Aviv (IL)

(73) Assignee: International Business Machines Corporation, Armonk, NY (US)

( * ) Notice: Subject to any disclaimer, the term of this patent is extended or adjusted under 35 U.S.C. 154(b) by 146 days.

(21) Appl. No.: 13/930,729

(22) Filed: Jun. 28, 2013

(65) Prior Publication Data

US 2015/0006910 A1    Jan. 1, 2015

(51) Int. Cl.
*G06F 12/14* (2006.01)

(52) U.S. Cl.
CPC ........ *G06F 12/1408* (2013.01); *G06F 12/1483* (2013.01); *G06F 12/1466* (2013.01); *G06F 12/14* (2013.01)

(58) Field of Classification Search
CPC . G06F 12/14; G06F 12/1408; G06F 12/1466; G06F 12/1483
See application file for complete search history.

(56) References Cited

U.S. PATENT DOCUMENTS

| | | | |
|---|---|---|---|
| 8,341,429 B2 | 12/2012 | Buckingham et al. | |
| 8,621,241 B1 * | 12/2013 | Stephenson | 713/193 |
| 2005/0244001 A1 * | 11/2005 | Kitani et al. | 380/201 |
| 2008/0229428 A1 * | 9/2008 | Camiel | 726/27 |
| 2009/0319772 A1 * | 12/2009 | Singh et al. | 713/153 |
| 2010/0064354 A1 | 3/2010 | Irvine | |
| 2011/0258456 A1 | 10/2011 | Lyakhovitskiy | |
| 2012/0047360 A1 * | 2/2012 | Kuno et al. | 713/150 |
| 2013/0067242 A1 | 3/2013 | Lyakhovitskiy et al. | |

OTHER PUBLICATIONS

Basmov, K. et al.; "Management of certain types of Self-Encrypting Drive Credentials"; An IP.com Prior Art Database Technical Disclosure; http://ip.com/IPCOM/000208700D; Jul. 15, 2011.

* cited by examiner

*Primary Examiner* — Krisna Lim
(74) *Attorney, Agent, or Firm* — Arnold B. Bangali; Feb R. Cabrasawan

(57) ABSTRACT

A method for encrypting data on a disk drive using self encrypting drive is provided. The method includes encryption of data chunks of a computing device. The method further includes associating the encrypted data chunks with encryption key indexes of the computing device. Moreover, the method further includes receiving the encryption key indexes for given logical block addresses of the data chunks. The method further includes determining the encryption keys to be used to encrypt the data chunks based on the encryption key indexes of the data chunks to the disk drive.

20 Claims, 5 Drawing Sheets

MULTIPLE VOLUME ENCRYPTION OF STORAGE DEVICES USING SELF ENCRYPTING DRIVE (SED)

FIELD OF THE INVENTION

The present invention relates generally to computing systems, and more particularly to multiple volume encryption of data on storage devices using self-encrypting drive (SED).

BACKGROUND

A storage system typically comprises one or more storage devices into which data may be entered, and from which data may be obtained, as desired. The storage system may be implemented in accordance with a variety of storage architectures including, but not limited to, a network-attached storage environment, a storage area network and a disk assembly directly attached to a client or host computer. Storage systems are typically disk drives, wherein the term "disk" commonly describes a self-contained rotating magnetic media storage device. Disks within storage systems are typically organized as one or more groups, wherein each group is operated as a Redundant Array of Independent Disks (RAID). Further, most RAID implementations enhance the reliability/integrity of data storage through the redundant writing of data "stripes" across a given number of physical disks in the RAID group, and the appropriate storing of redundant information with respect to the striped data. The redundant information enables recovery of data lost when the storage system is inoperable or fails. Moreover, a disk or storage array of a storage system is a disk storage system which contains multiple disk drives. For example, a disk array provides increased availability, resiliency and maintainability by using additional, redundant components (controllers, power supplies, fans, etc.), often up to the point when all single points of failure (SPOFs) are eliminated from the design.

Moreover, storage systems typically provide logical volumes of data to computing systems, where each volume of data represents a logical storage unit, but in fact is usually implemented over several physical devices, e.g., RAID. Conversely, a self-encrypting disk (SED) drive of the storage system supports the encryption of a relatively small number of contiguous bands of data in the drive. For example, SED enables integrated encryption and access control within the protected hardware of the drive. Self-encrypting drives further provide the industry's preferred solution for full disk encryption, protecting data when the machines or drives are lost or stolen, as well as re-purposed, warranty repair, and end-of-life.

SUMMARY

In one embodiment a method for encrypting data of a disk drive using self encrypting drive (SED) is provided. The method includes encrypting, by one or more computer processors, data chunks of a computing device. The method further includes associating, by the one or more computer processors, the encrypted data chunks with encryption key indexes of the device, wherein said encryption key indexes specify encryption keys to use for each chunk. The method further includes receiving, by the one or more computer processors, the encryption key indexes for given logical block addresses of the data chunks, wherein the data chunks are read or written to logical block addresses on the disk drive. The method further includes determining, by the one or more computer processors, the encryption keys to be used to encrypt the data chunks based on the encryption key indexes of the data chunks to the disk drive.

In another embodiment, a computer system for encrypting data on a disk drive using self encrypting drive (SED) is provided. The computer system comprises one or more processors, one or more computer-readable memories, one or more computer-readable tangible storage devices and program instructions which are stored on at least one of the one or more storage devices for execution by at least one of the one or more processors via at least one of the one or more memories. The computer system further comprises program instructions to encrypt data chunks of a computing device. The computer system further comprises program instructions to associate the encrypted data chunks with encryption key indexes of the device, wherein said encryption key indexes specify encryption keys to use for each chunk. The computer system further comprises program instructions to receive, by the one or more computer processors, the encryption key indexes for given logical block addresses of the data chunks, wherein the data chunks are read or written to logical block addresses on the disk drive. The computer system further comprises program instructions to determine the encryption keys to be used to encrypt the data chunks based on the encryption key indexes of the data chunks to the disk drive.

In yet another embodiment, a computer program product for encrypting data on a disk drive using self encrypting drive (SED) is provided. The computer program product comprises one or more computer-readable tangible storage devices and program instructions stored on at least one of the one or more storage devices. The computer program product further comprises program instructions to encrypt data chunks of a computing device. The computer program product further comprises program instructions to associate the encrypted data chunks with encryption key indexes of the device, wherein said encryption key indexes specify encryption keys to use for each chunk. The computer program product further comprises program instructions to receive, by the one or more computer processors, the encryption key indexes for given logical block addresses of the data chunks, wherein the data chunks are read or written to logical block addresses on the disk drive. The computer program product further comprises program instructions to determine the encryption keys to be used to encrypt the data chunks based on the encryption key indexes of the data chunks to the disk drive.

BRIEF DESCRIPTION OF THE SEVERAL VIEWS OF THE DRAWINGS

Novel characteristics of the invention are set forth in the appended claims. The invention itself, however, as well as preferred mode of use, further objectives, and advantages thereof, will be best understood by reference to the following detailed description of the invention when read in conjunction with the accompanying Figures, wherein, like reference numerals indicate like components, and:

DETAILED DESCRIPTION

Figure 1A:
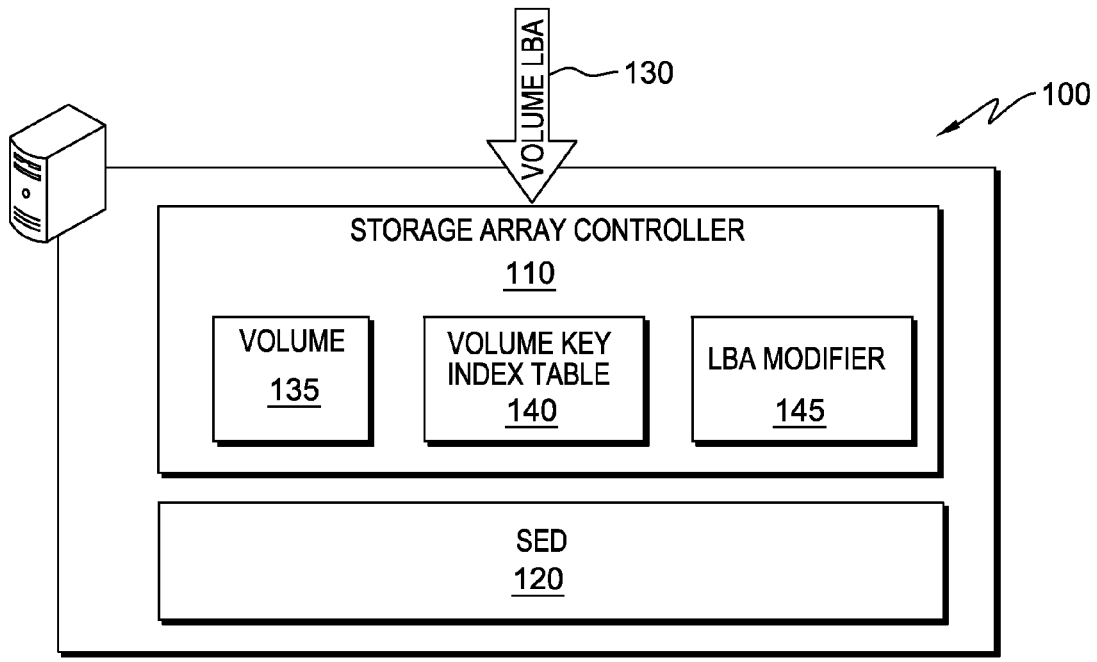
FIG. 1A-1B are functional block diagrams of a storage computing environment 100 for encrypting data chunks within a disk drive of storage computing environment 100 using flexible key management of a self encrypting drive (SED), in accordance with embodiments of the present invention.

The present invention will now be described in detail with reference to the accompanying Figures. Referring now to FIG. 1, storage computing environment 100 for encrypting data chunks within a disk drive of storage computing environment 100 using flexible key management that supports encryption of different data blocks chunks with different encryption keys, wherein the keys do not leave the drive is shown. Each key can protect arbitrarily located data chunks of storage computing environment 100. The data protected by a given key does not have to be continuous, nor do all regions of the data have to be the same.

For example, different chunks of data on a disk drive may differ in security requirements. One chunk may have no restrictions, while another may be associated with one user/application, and a third with a different application. Management of the encryption keys externally allows a high degree of control over what data is encrypted with which key, but having the keys themselves stored externally is a security risk. On the other hand, self-encrypting disk (SED) provide secure key usage, by ensuring that keys never leave the drive, but are inflexible in the way keys are mapped to data. The present invention specifically provides levels of indirection, outside of the SED of storage computing environment, including, each data chunk, which is associated with a key index. Data associated with different key indexes is encrypted with different keys, as described in further details below.

The SED receives the key index encoded as part of the logical block address (LBA) of the data to be read or written, and uses the key index to retrieve the internal encryption key. For example, consider data for volume A that is to be written at blocks 0x100-0x200 of a storage controller of storage computing environment 100 using encryption by SED. Also, consider, for instance that the key index for volume A is 0x53. The storage controller will combine 0x53 to the LBA of 0x100, resulting in 0x00530000100, and send a write command to this LBA with the relevant data. The SED internally retrieve the key associated with key index 0x53, and use this key to encrypt the data actually written to the storage media. In another example, consider data from volume B of storage computing environment 100 is to be read from blocks 0x4000-0x4010, and the key index for volume B is 0x42. The storage controller will combine 0x42 to the LBA of 0x4000, resulting, say, in 0x00420004000, and send a read command to this LBA. The SED will internally retrieve the encryption key associated with key index 0x42, and use this to decrypt the data read from the storage media before passing it on to the storage controller. The number of different keys supported can be large, and each encryption key can protect arbitrary regions of data, wherein the data protected by a given key does not have to be continuous, and also, all regions of the protected data do not have to be the same size.

For example, in a block-oriented storage system, such as a SAN, logical storage units (LUNs) or volumes are typically spread across several drives. Further, the physical location of the part of a volume that's stored on a specific drive may change dynamically, e.g., if the volume is resized, or if a failure occurs on another drive and the redundant data needs to be redistributed among the remaining drives. Such use-cases are not well served by existing SED, which can be configured to encrypt only contiguous ranges of addresses or bands with specific keys. In this manner data belonging to different volumes will be encrypted with the same key if they are stored on the same band. By specifying which key is to be used, but not the key itself along with the data to be read or written, it can be ensured that different volumes are encrypted by the drive with different keys, regardless of where the data is physically stored.

Consider, for example, a volume currently taking up the first 100,000 blocks of a SED. If the volume is resized such that another 50,000 blocks are needed, but the next contiguous area is unavailable, the storage controller can write the data anywhere on the drive, as long as it is associated with the same key index as the original 100,000 blocks. Moreover, a drive has two different volumes stored on it, one encrypted with key "a" associated with key index 1, and another encrypted with key "b" associated with key index 2. For example, the storage controller can interleave these volumes or write them in totally disjoint parts of the disk, and the encryption keys used by one will not be used by the other as long as the key indexes are sent correctly along with the data.

Storage computing environment 100 can be, for example a storage or disk array. The disk array is a disk storage system which can contain multiple disk drives. For example, the disk storage system is a general category of storage mechanisms where data are recorded by various electronic, magnetic, optical, or mechanical changes to a surface layer of one or more rotating disks. A disk drive is a device implementing such a storage mechanism and is usually distinguished from the disk medium. Notable types are the hard disk drive (HDD) containing a non-removable disk, the floppy disk drive (FDD) and its removable floppy disk, and various optical disc drives and associated optical disc media. Storage computing environment 100 can also be, for example server computing system such as, a management server, a web server, or any other electronic device or computing system. The server computing system can also represent a "cloud" of computers interconnected by one or more networks, wherein the server computing system can be a primary server for a computing system utilizing clustered computers when accessed through a storage computing environment.

As depicted in FIG. 1, storage computing environment 100 includes storage array controller 110 and self-encrypting disk (SED) 120. One skilled in the art would appreciate storage computing environment 100 includes other computing devices that are not depicted in FIG. 1. Storage array controller 110 is a storage device that handles storage requests for storage computing environment 100, from, for example, a host of storage computing environment 100. Storage array controller 110 can also manage logical storage units across physical disk drives. Storage array controller 110 can also implement hardware RAID.

Redundant array of independent disks (RAID) is a storage technology that combines multiple disk drive components into one or more logical units. Data of storage array controller 110 is distributed across the drives in one of several ways called "RAID levels", depending on the level of redundancy and performance required, in accordance with embodiments of the present invention. In the depicted environment, storage array controller 110 receives data request commands 130 to read or write data on a given volume at a given logical block access range of storage array controller 110. Data request commands 130 can be received from a systems administrator or host of storage computing environment 100. According to least one embodiment, data request commands 130 access can be either a read or write command, wherein the data is either the data to be read or written. The data could also be data that is stored on the storage array controller 110 in encrypted form. For example, volume 135 of a data request command can further be logical unit (LU) of storage array controller 110 which the host or systems administrator of storage computing environment 100 wishes to access, typically in the form of a logical unit number (LUN), as described below.

The LUN represents a number used to identify a logical unit of storage array controller 110. The LUN may also support read/write operations of storage computing environment 100, for example, in this manner, the requested data of data request command 130 is either the data to be read or written. For example, process of data request command 130 request to access storage computing environment 100 can include a read logical block addresses 1000 to 1010 of storage computing environment 100 from logical unit number 17. Data in this case is the data that is returned from a specified storage location of storage array controller 110. Further, in another example, a data request command 130 to access storage computing environment 100 can also include a write which includes all zeroes to a logical unit number 32, which is the volume of storage array controller 110 for 700 blocks starting at logical block address 500.

Volume 135 can be a storage element of storage array controller 110, which includes, for example, an amount of usable storage capacity that may be written or read from storage computing environment 100. Volume 135 may also be implemented on one or more storage devices, such as, hard disk drives or solid state disks of storage computing environment 100. Volume 135, which is also known as a logical unit, and identified by LUN of storage array controller 110. For example, LUN 17 of storage array controller 110 can represent, for example, a volume of 17 Gigabytes capacity, and LUN 42 represents a volume of 34 Gigabytes capacity.

Logical block address (LBA) is the address of a logical block of storage data of storage array controller 110, that is, the offset of the block from the beginning of the block address space of the volume containing it. For example, LBA 513 of storage array controller 110 refers to the address of the 513$^{th}$ block of data in a given volume of storage array controller 110. Volume key index table 140 is data table of storage array controller 110 that includes one or more columns of the table, which determines which key index corresponds to which volume in storage array controller 110.

For example, volume key index table 140 can include two columns, including, for example, a column with volume LUNs and another column with a corresponding key index. For example, the first entry of the table could contain LUN 57 and key index 31415, the second entry of the table could contain LUN 14 and key index 7172, etc. Logical block address (LBA) modifier 145 is a functional unit of storage array controller 110 that accepts as input, LBA and key index, and combines them into a modified LBA that SED 120 can accept and reverse operation, of a key index extractor of SED 120, as described below. For example, LBA modifier 145 operates to logically "OR" the bits of the key index into the most significant part of the LBA, which would otherwise be all zeroes. For example, consider the following scenario, in which, given a 10 byte long LBA address space, and LBA of 0x000000000000003000 (hexadecimal) and a key index of 0x1234 (hexadecimal), the resulting new LBA would be 0x123400000000003000 (hexadecimal).

Figure 1B:
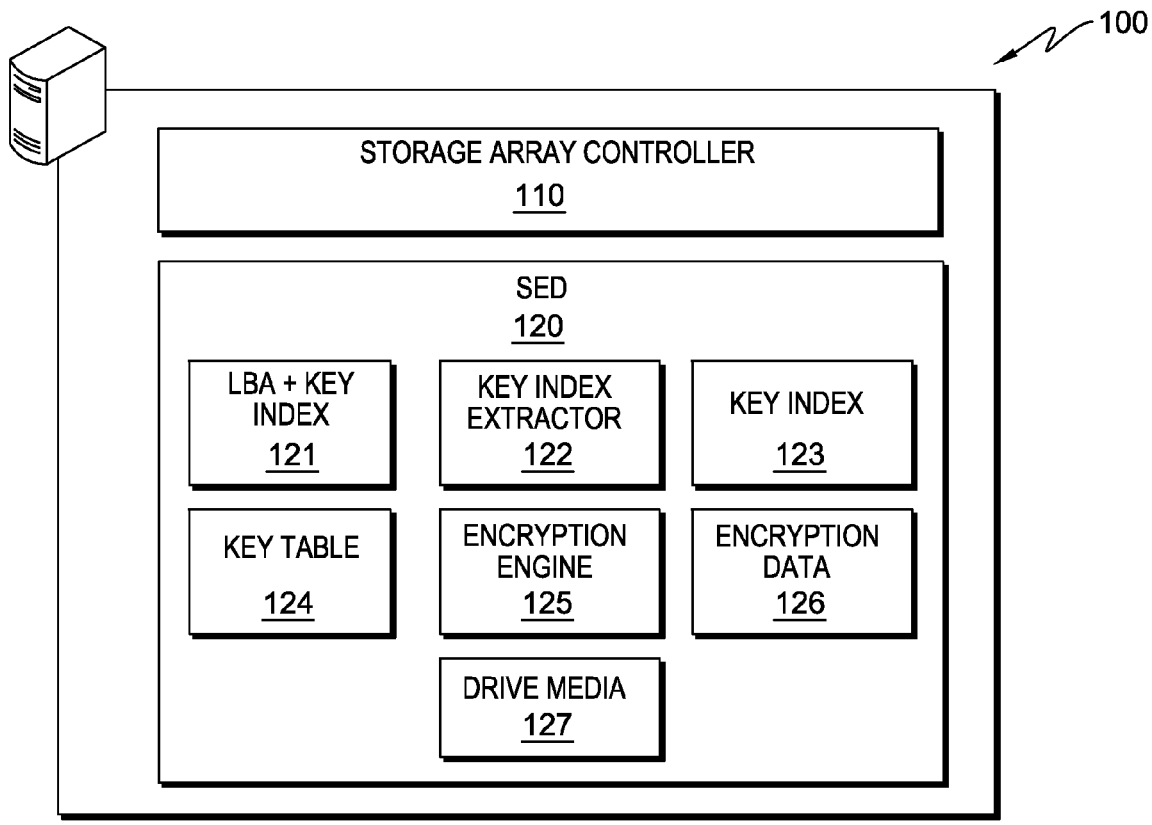

FIG. 1B is functional block diagram showing detail of self encrypting disk (SED) 120 in storage computing environment 100, in accordance with embodiments of the present invention. SED 120 is an encryption storage device that encrypts data of storage computing environment 100. SED 120 also protects user data stored in the hard disks of storage computing environment 100 that is written to it, and can further decrypt the same data read from it, using internal cryptographic keys. Moreover, in accordance with SED 120, data stored in a hard disk of storage computing environment 100 is always kept encrypted, and a user can selectively and freely turn on and off encryption functionality.

Further, SED 120 employs a disk encryption key and an authentication key for controlling access to a disk for directly encrypting data. Here, the hash value of the authentication key is stored in a hard disk, is used to authenticate a user and is used to decrypt the disk encryption key after the user has been successfully authenticated. SED 120 includes LBA+key index 121, key index extractor 122, key index 123, key table 124, encryption engine 125, encryption data 126, and drive media 127. Logical block address (LBA)+key index 121 is a combination of an index key of storage computing environment 100 and LBA as generated by LBA modifier of storage array controller 110, as described above. Key index 123 is the key index as extracted by key index extractor 122. Given a combined key index 123 and LBA address in the form of a modified LBA, key index extractor 122 extracts original LBA and the key index of SED 120, performing the inverse operations of the LBA modified, as described above. For example, given a 10 byte long LBA address space, and a combined LBA of 0x123400000000003000, key index extractor would output an LBA of 0x000000000000003000 and a key index of 0x1234. Key index 123 is an entry into key table, including, for example, 0x1234. Key table 124 is a table with columns, including, for example, the first entry of the table could contain key index 31415, and the key 0x317480210393639894503411278544, the second entry of the table could contain key index 7172 and the key, for example, 0x257128159065823535545318720873 Encryption engine 125 is a unit that performs encryption and decryption of data given a cryptographic key, using a standard encryption algorithm, such as advanced encryption standard (AES). Encryption data is data that has been encrypted by a standard encryption algorithm using a cryptographic key. Drive media 127 is a physical media of SED 120 upon which data of SED 120 is stored persistently and retrieved upon demand.

Figure 2:
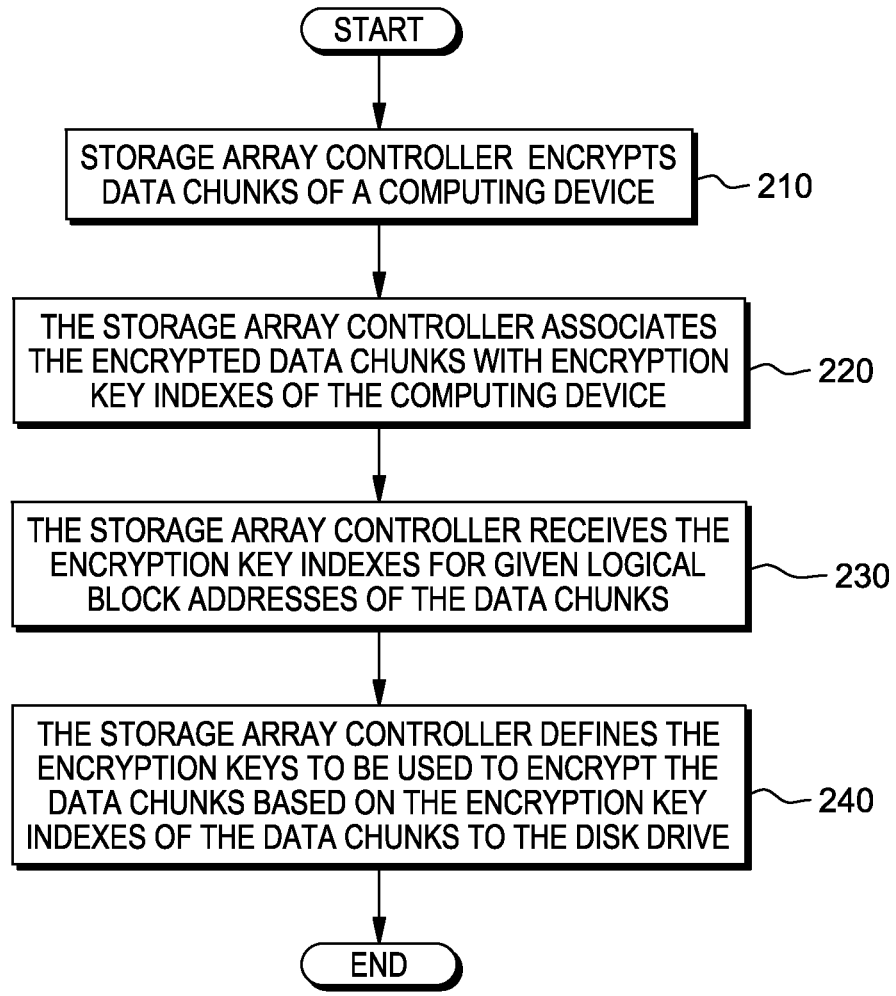
FIG. 2 is a flowchart depicting steps performed by a storage array controller of a storage computing environment for encrypting data chunks within a disk drive of storage computing environment 100 using flexible key management of a self encrypting drive (SED), in accordance with embodiments of the present invention.

FIG. 2 is a flowchart depicting steps performed by storage array controller 110 to encrypt data on a disk drive using flexible key management of SED 120 of storage computing environment 100, in accordance with embodiments of the present invention. Storage array controller 110 encrypts data chunks of a computing device, including, for example, storage computing environment 110 (Step 210). For example, the disk drive can be SED 120, wherein SED 120 encrypts data that is written to it, and decrypts the encrypted data that is read from it using an internal cryptographic key. SED 120 maps the encryption key indexes and encryption keys maintained internally within SED 120.

Moreover, storage array controller 110 associates the encrypted data chunks with encryption key indexes of the storage computing environment 100. For example, encryption key indexes specify encryption keys to use for each chunk of storage array controller 110 (Step 220). The encryption key indexes provide security to the data chunks of storage computing environment 100. Also, the data chunk protected by the encryption key indexes does not have to be contiguous, nor do all of the chunks have to be the same size. Further, storage array controller 110 receives the encryption key indexes for given logical block addresses of the data chunks, wherein the data chunks are read or written to logical block addresses on the disk drive (Step 230). For example, storage array controller 110 accesses the data chunks on a given volume 135 and a logical address range of the logical block addresses of the disk drive.

For instance, volume 135 is a storage element of the disk drive, and wherein the storage element of the volume is usable storage capacity of the disk drive that can be written to and read from the disk drive. Volume 135 may be stored across one or more disk drives, and wherein the one or more disk drives may contain data belonging to more than one volume. Moreover, storage array controller 110 receives logical block addresses and the encryption key indexes as an input of the disk drive of SED 120.

Storage array controller 110 further combines the received logical block addresses and the encrypted key indexes into a modified logical block address, wherein the modified logical block address is accepted by the disk drive. Moreover, storage array controller 110 defines the encryption keys to be used to encrypt the data chunks based on the encryption key indexes of the data chunks to the disk drive. (Step 240).

Figure 3A:
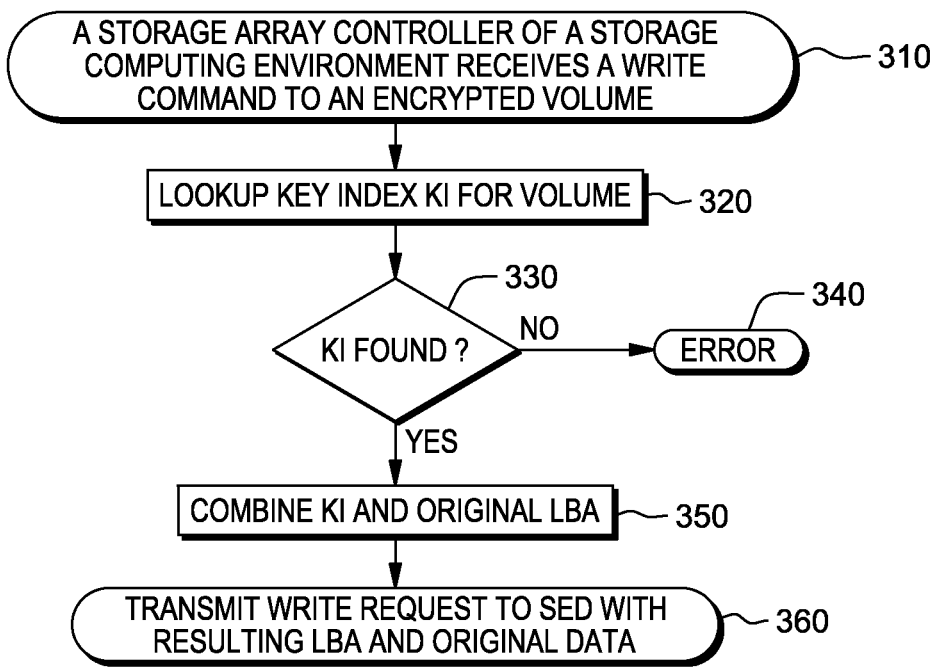
FIG. 3A-3D are flowcharts depicting steps performed by storage array controller to process SED operations for writing encrypted data of storage computing environment, in accordance with embodiments of the present invention.

FIG. 3A is a flowchart depicting steps storage array controller 110 can take to process writing to an encrypted volume of storage computing environment 100, in accordance with embodiments of the present invention. Storage array controller 110 receives a write command from a host or systems administrator of storage computing environment 100. (Step 310). For example, the command contains the target logical unit number (LUN) and logical block address of data to be stored, as well as data itself of storage computing environment 100. Storage array controller 110 maps the LUN to a volume using a user defined mapping table. For example, write block data to LBA 500 on LUN 12, where LUN 12 maps to volume V1. Storage array controller 110 identifies the key index (KI) associated with volume. (Step 320). A key index can be kept for each volume using commonly known techniques, such as a linear array, hash table, binary tree, etc. At decision 330, storage array controller 110 determines whether the key index is found. If no key index is found, then at step 340, storage array controller 110 returns an error.

For example, if no key index is found, though the volume was specified as encrypted, there is no cryptographic key associated with the volume. One way of handling the error can include, for example, generation of the key index, as described below, in FIG. 3D. However, if a key index is found, then at step 350, storage array controller 110 combines the key index and LBA in a predefined manner, such that SED 120 is capable of extracting original values unambiguously. For example, the key index can be written in the most significant bits of the LBA, which can result in an address beyond the storage range of storage computing device. At step 360, storage program transmits a write request to SED with resulting LBA and original data of storage computing environment 100.

Figure 3B:
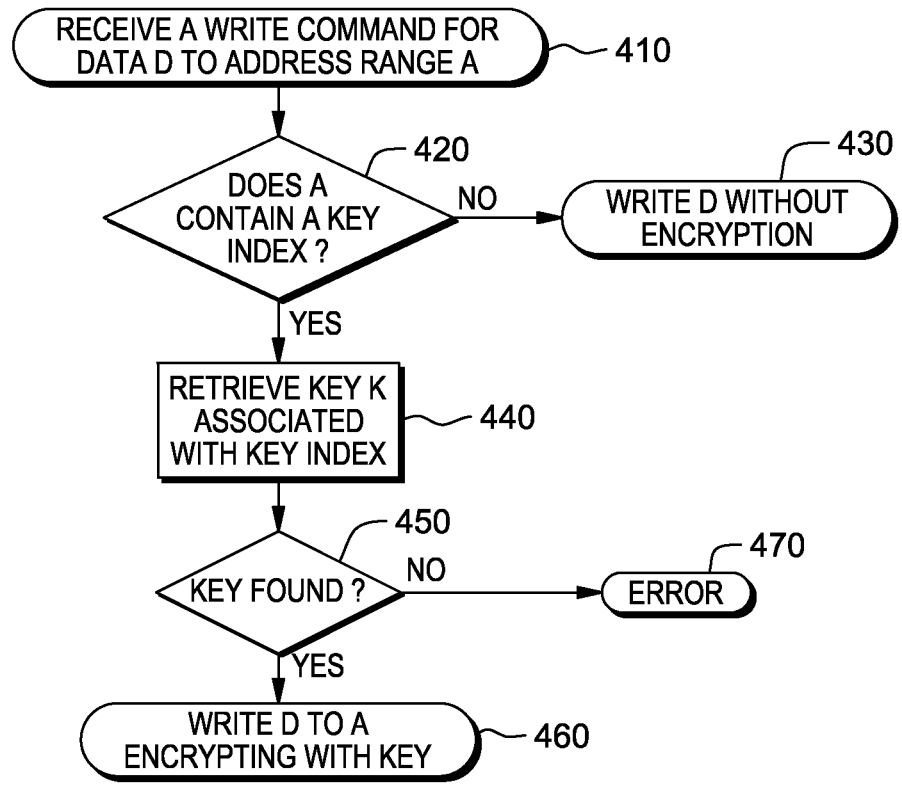

FIG. 3B is a flowchart depicting steps performed by SED 120 for writing encrypted data of storage computing environment 100, in accordance with embodiments of the present invention. SED 120 receives a write request or command with data to an address range from storage array controller 110. The write request can include, for example, a command for data D access to address range A of storage array controller 110. (Step 410). At decision 420, SED determines if the address range, such as A, contains a key index. For example, this determination can be based on whether if the key index was combined with the original LBA.

If no key index is found, then at step 430, SED 120 processes the request as a regular write request. However, if a key index is found, then the corresponding encryption key is retrieved by SED 120 at step 440. The key can be stored using, for example, a linear array, hash table or binary tree. SED 120 further determines, at decision 450 if the retrieved key index includes a key. If a key is found, then at step 460, SED 120 writes it to the storage media of storage array controller 110 using an encryption algorithm such as AES in an appropriate mode, such as XTS. However, if no key is found, SED 120 transmits an error for display at step 470.

Figure 3C:
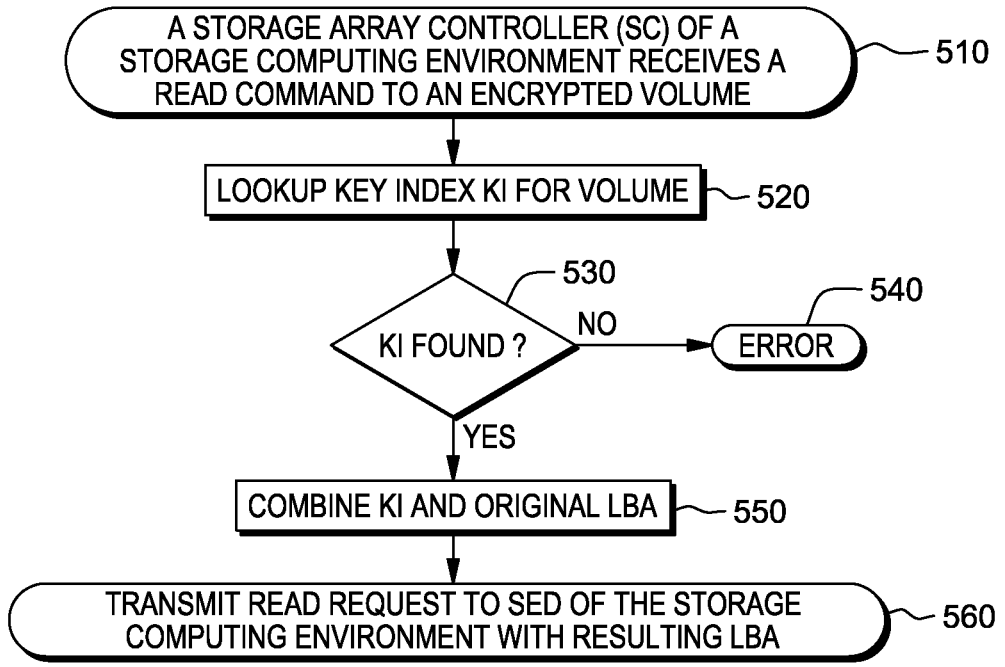

FIG. 3C is a flowchart depicting steps performed by storage array controller 110 to process reading from an encrypted volume of storage computing environment 100, in accordance with embodiments of the present invention. Storage array controller 110 receives a read command for an encrypted volume from storage computer environment 100. (Step 510). For example, a systems administrator sends a read command to storage array controller 110 of storage computing environment 100.

The command includes, for example, target logical unit number (LUN) and logical block address (LBA) of the data to be read from storage array controller 110, as well as the amount of data to read. Storage array controller 110 maps the LUN to a volume using a user defined mapping table, as is standard practice. For example, read 1 block of data from LBA 500 on LUN 12, where LUN 12 maps to volume V1. Further, given that the destination volume was configured as encrypted, lookup the key index (KI) associated with the volume. Also, a key index can be kept for each volume using commonly known techniques, such as a linear array, hash table, binary tree, etc. (Step 520). At decision 530, storage array controller 110 determines if key index was found. If no key index was found, storage array controller 110 returns an error at step 540. For instance, the error message can mean that although the volume was specified as encrypted, there is no cryptographic key associated with it.

If a key index is found, then at step 550, key index and logical block address (LBA) are combined in a predefined manner, such that SED 120 drive is capable of extracting the original value unambiguously. For example, the key index can be written in the most significant bits of the LBA, which, if interpreted literally, would result in an address beyond the storage range of the device. Further, at step 560, storage array controller 110 transmits a read request to the corresponding disk or disks. This request consists of the combined LBA created in the previous step and the amount of data to be read.

Figure 3D:
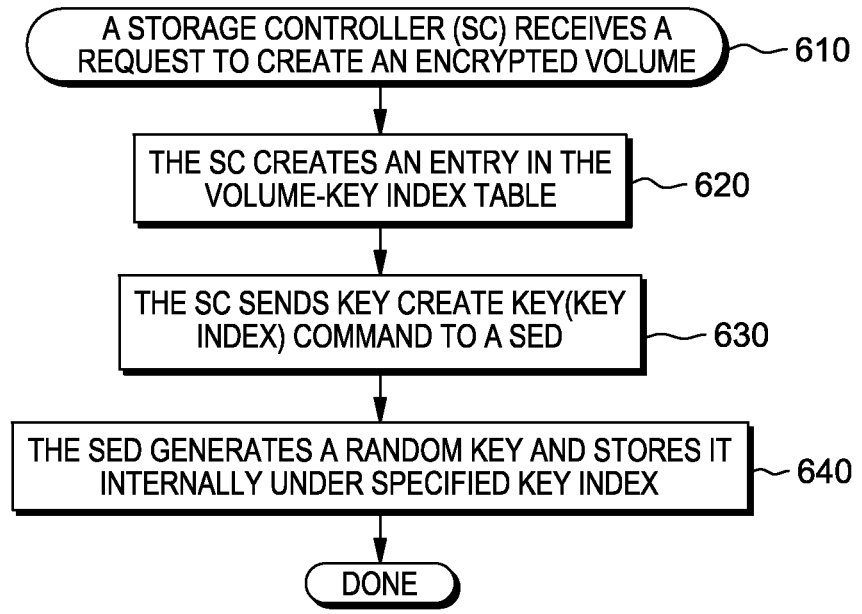

FIG. 3D is a flowchart depicting steps performed by storage array controller 110 for generating a key for an encrypted volume. Storage array controller 110 receives a request to create an encrypted volume of storage computing environment 100. (Step 610). For example, a system storage administrator of storage computing environment 100 specifies that an encrypted volume is to be created. Storage array controller 110 creates an entry in the volume-key index table. (Step 620). For example, storage array controller 110 generates key index, and stores it, along with the volume identifier, in an array, hash table, binary tree or other commonly known method for storing keys and values. The key index can be a random number, a monotonically increasing value or an encoding of system-specific information, as long as it is unique in the system.

Storage array controller 110 sends the key index command to SED 120 (Step 630). For example, storage array controller 110 sends the Create Key command to SED 120, passing the key index generated in as a parameter. SED 120 drive generates a random key and stores it internally under specified key index (Step 640). For example, SED 120 internally generates random cryptogprahic key, and stores it internally such that it can be retrieve upon command given corresponding key index. Thereafter, SED 120 signals that the process has been completed.

Figure 4:
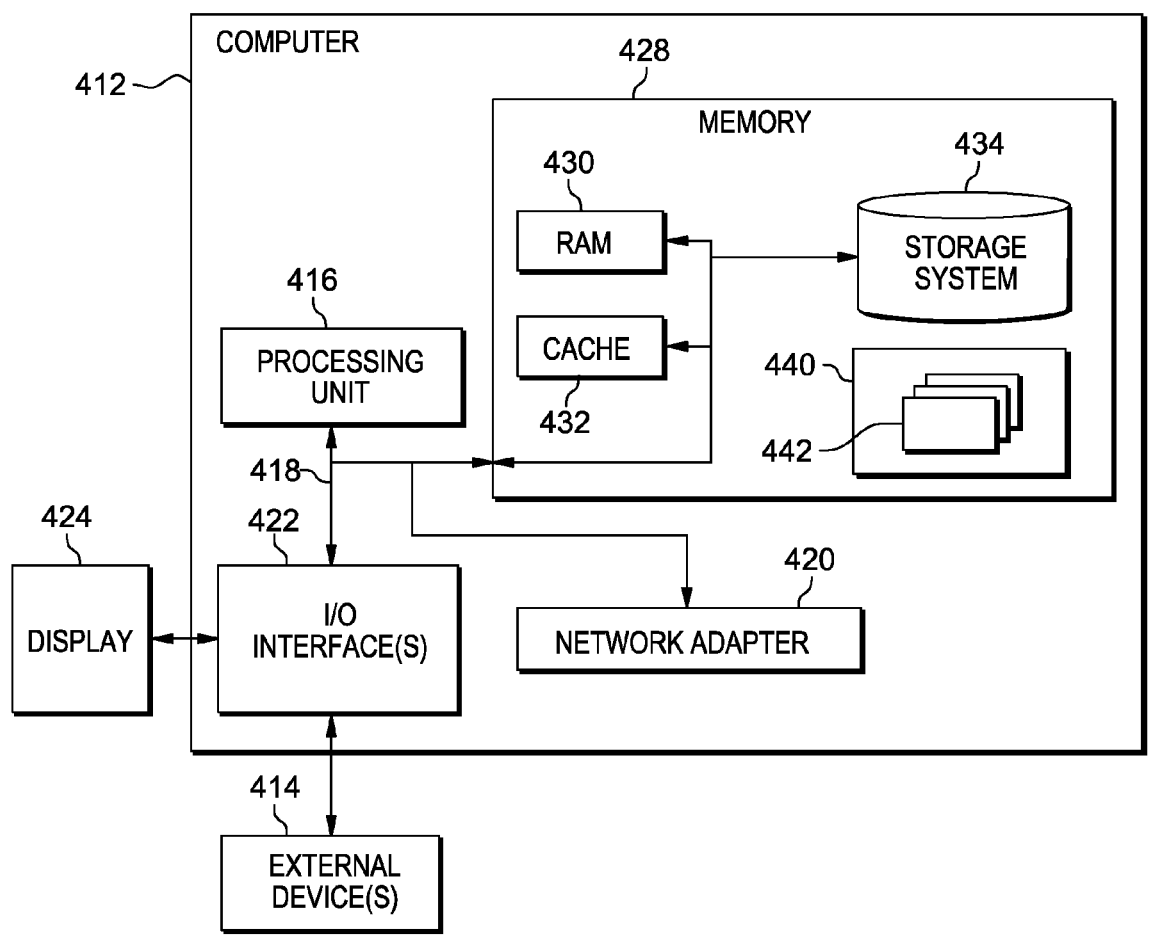
FIG. 4 illustrates a block diagram of components of computer system, in accordance with embodiments of the present invention.

FIG. 4 is a block diagram of a computer system, in accordance with an embodiment of the present invention.

Computer system 400 is only one example of a suitable computer system and is not intended to suggest any limitation as to the scope of use or functionality of embodiments of the invention described herein. Regardless, computer system 400 is capable of being implemented and/or performing any of the functionality set forth hereinabove. In computer system 400 there is computer 412, which is operational with numerous other general purpose or special purpose computing system environments or configurations. Examples of well-known computing systems, environments, and/or configurations that may be suitable for use with computer 412 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Storage computing environment 100 can be implemented as an instance of computer 412.

Computer 412 may be described in the general context of computer system executable instructions, such as program modules, being executed by a computer system. Generally, program modules may include routines, programs, objects, components, logic, data structures, and so on that perform particular tasks or implement particular abstract data types. Computer 412 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 4, computer 412 is shown in the form of a general-purpose computing device. The components of computer 412 may include, but are not limited to, one or more processors or processing units 416, memory 428, and bus 418 that couples various system components including memory 428 to processing unit 416.

Bus 418 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 412 typically includes a variety of computer system readable media. Such media may be any available media that is accessible by computer 412, and includes both volatile and non-volatile media, and removable and non-removable media.

Memory 428 includes computer system readable media in the form of volatile memory, such as random access memory (RAM) 430 and/or cache 432. Computer 412 may further include other removable/non-removable, volatile/non-volatile computer system storage media. By way of example only, storage system 434 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 418 by one or more data media interfaces. As will be further depicted and described below, memory 428 may include at least one program product having a set (e.g., at least one) of program modules that are configured to carry out the functions of embodiments of the invention.

Storage array controller 110 can be stored in memory 428 by way of example, and not limitation, as well as an operating system, one or more application programs, other program modules, and program data. Each of the operating system, one or more application programs, other program modules, and program data or some combination thereof, may include an implementation of a networking environment. Program modules 442 generally carry out the functions and/or methodologies of embodiments of the invention as described herein. Storage array controller 110 can be implemented as an instance of program 440.

Computer 412 may also communicate with one or more external devices 414 such as a keyboard, a pointing device, etc., as well as display 424; one or more devices that enable a user to interact with computer 412; and/or any devices (e.g., network card, modem, etc.) that enable computer 412 to communicate with one or more other computing devices. Such communication occurs via Input/Output (I/O) interfaces 422. Still yet, computer 412 communicates with one or more networks such as a local area network (LAN), a general wide area network (WAN), and/or a public network (e.g., the Internet) via network adapter 420. As depicted, network adapter 420 communicates with the other components of computer 412 via bus 418. It should be understood that although not shown, other hardware and/or software components could be used in conjunction with computer 412. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustrations are implemented by special purpose hardware-based systems that perform the specified functions or acts, or combinations of special purpose hardware and computer instructions.

As will be appreciated by one skilled in the art, embodiments of the present invention may be embodied as a system, method or computer program product. Accordingly, embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the present invention may take the form of a computer program product embodied in one or more computer-readable medium(s) having computer-readable program code embodied thereon.

In addition, any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that contains, or stores a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for embodiments of the present invention may be written in any combination of one or more programming languages, including an object oriented programming language such as Java, Smalltalk, C++ or the like, conventional procedural programming languages such as the "C" programming language, a hardware description language such as Verilog, or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Based on the foregoing a method for encrypting data on a disk drive using self encrypting drive (SED) have been disclosed. However, numerous modifications and substitutions can be made without deviating from the scope of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. Therefore, the present invention has been disclosed by way of example and not limitation.

What is claimed is:

1. A method for encrypting data on a disk drive using self encrypting drive (SED), the method comprising the steps of:
   encrypting, by one or more computer processors, data chunks of a computing device;
   associating, by the one or more computer processors, the encrypted data chunks with encryption key indexes of the computing device, wherein said encryption key indexes specify encryption keys to use for each chunk;
   receiving, by the one or more computer processors, the encryption key indexes for given logical block addresses of the data chunks, wherein the data chunks are read or written to logical block addresses on the disk drive; and
   determining, by the one or more computer processors, the encryption keys to be used to encrypt the data chunks based on the encryption key indexes of the data chunks to the disk drive.

2. The method of claim 1, wherein the encryption key indexes provide security to the data chunks of the computing device, and wherein the data chunks protected by the encryption key indexes does not have to be contiguous, nor do all of the chunks have to be the same size.

3. The method of claim 1, wherein the step of receiving, by the one or more computer processors, the encryption key indexes for logical block addresses of the data chunks, wherein the logical block addresses of the data chunks are read or written to the disk drive, further including the step of:
   accessing, by the one or more computer processors, the data chunks on a given volume and a logical address range of the logical block addresses of the disk drive.

4. The method of claim 3, wherein the volume is a storage element of the disk drive, and wherein the storage element of the volume is usable storage capacity of the disk drive that can be written to and read from of the disk drive.

5. The method of claim 4, wherein the volume is stored across one or more disk drives, and wherein the one or more disk drives may contain data belonging to more than one volume.

6. The method of claim 1, further including the step of:
   receiving, by the one or more computer processors, the logical block addresses and the encryption key indexes as an input of the disk drive; and
   combining, by the one or more computer processors, the received logical block addresses and the encrypted key indexes into a modified logical block address, wherein the modified logical block address is accepted by the disk drive.

7. The method according to claim 1, wherein the disk drive is a self encrypting drive that maps the encryption key indexes and the encryption keys maintained internally within the self encrypting drive, and wherein the self encrypting drive encrypts data that is written to it, and decrypts the encrypted data that is read from it using internal cryptographic keys.

8. A computer system for encrypting data on a disk drive using self encrypting drive (SED), the computer system comprising:
    one or more processors, one or more computer-readable memories, one or more computer-readable tangible storage devices and program instructions which are stored on at least one of the one or more storage devices for execution by at least one of the one or more processors via at least one of the one or more memories, the program instructions comprising:
        program instructions to encrypt data chunks of a computing device;
        program instructions to associate the encrypted data chunks with encryption key indexes of the computing device, wherein said encryption key indexes specify encryption keys to use for each chunk;
        program instructions to receive the encryption key indexes for given logical block addresses of the data chunks, wherein the data chunks are read or written to logical block addresses on the disk drive; and
        program instructions to determine the encryption keys to be used to encrypt the data chunks based on the encryption key indexes of the data chunks to the disk drive.

9. The computer system of claim 8, wherein the encryption key indexes provide security to the data chunks of the computing device, and wherein the data chunks protected by the encryption key indexes does not have to be contiguous, nor do all of the chunks have to be the same size.

10. The computer system of claim 8, wherein program instructions to receive the encryption key indexes for logical block addresses of the data chunks, wherein the logical block addresses of the data chunks are read or written to the disk drive, further includes: program instructions to access, by the one or more computer processors, the data chunks on a given volume and a logical address range of the logical block addresses of the disk drive.

11. The computer system of claim 10, wherein the volume is a storage element of the disk drive, and wherein the storage element of the volume is usable storage capacity of the disk drive that can be written to and read from of the disk drive.

12. The computer system of claim 11, wherein the volume is stored across one or more disk drives, and wherein the one or more disk drives may contain data belonging to more than one volume.

13. The computer system of claim 8, further includes:
    program instructions to receives the logical block addresses and the encryption key indexes as an input of the disk drive; and
    program instructions to combine the received logical block addresses and the encrypted key indexes into a modified logical block address, wherein the modified logical block address is accepted by the disk drive.

14. The computer system of claim 8, wherein the disk drive is a self encrypting drive that maps the encryption key indexes and the encryption keys maintained internally within the self encrypting drive, and wherein the self encrypting drive encrypts data that is written to it, and decrypts the encrypted data that is read from it using internal cryptographic keys.

15. A computer program product for encrypting data on a disk drive using self encrypting drive (SED), the computer program product comprising:
    one or more computer-readable tangible storage devices and program instructions stored on at least one of the one or more storage devices, the program instructions comprising:
        program instructions to encrypt data chunks of a computing device;
        program instructions to associate the encrypted data chunks with encryption key indexes of the computing device, wherein said encryption key indexes specify encryption keys to use for each chunk;
        program instructions to receives the encryption key indexes for given logical block addresses of the data chunks, wherein the data chunks are read or written to logical block addresses on the disk drive; and
        program instructions to determine the encryption keys to be used to encrypt the data chunks based on the encryption key indexes of the data chunks to the disk drive.

16. The computer program product of claim 15, wherein the encryption key indexes provide security to the data chunks of the computing device, and wherein the data chunks protected by the encryption key indexes does not have to be contiguous, nor do all of the chunks have to be the same size.

17. The computer program product of claim 15, wherein program instructions to receive the encryption key indexes for logical block addresses of the data chunks, wherein the logical block addresses of the data chunks are read or written to the disk drive, further includes: program instructions to access, by the one or more computer processors, the data chunks on a given volume and a logical address range of the logical block addresses of the disk drive.

18. The computer program product of claim 17, wherein the volume is a storage element of the disk drive, and wherein the storage element of the volume is usable storage capacity of the disk drive that can be written to and read from of the disk drive.

19. The computer program product of claim 18, wherein the volume is stored across one or more disk drives, and wherein the one or more disk drives may contain data belonging to more than one volume.

20. The computer program product of claim 15, further includes:
    program instructions to receives the logical block addresses and the encryption key indexes as an input of the disk drive; and
    program instructions to combine the received logical block addresses and the encrypted key indexes into a modified logical block address, wherein the modified logical block address is accepted by the disk drive.

* * * * *